(12) United States Patent
Kotzur et al.

(10) Patent No.: US 12,209,862 B2
(45) Date of Patent: Jan. 28, 2025

(54) AUTOMATIC, STATIONING OF A GEODETIC SURVEY INSTRUMENT BASED ON REFERENCE MARKER DATABASE

(71) Applicant: LEICA GEOSYSTEMS AG, Heerbrugg (CH)

(72) Inventors: Norbert Kotzur, Altstätten (CH); Zoltán Török, Berneck (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 34 days.

(21) Appl. No.: 18/227,847

(22) Filed: Jul. 28, 2023

(65) Prior Publication Data
US 2024/0035821 A1 Feb. 1, 2024

(30) Foreign Application Priority Data
Jul. 29, 2022 (EP) .................................... 22187882

(51) Int. Cl.
 *G01C 15/00* (2006.01)
 *G01C 21/16* (2006.01)
 *G06T 7/73* (2017.01)

(52) U.S. Cl.
 CPC ....... *G01C 15/002* (2013.01); *G01C 21/1656* (2020.08); *G06T 7/74* (2017.01)

(58) Field of Classification Search
 CPC .................................................... G01C 15/002
 See application file for complete search history.

(56) References Cited

U.S. PATENT DOCUMENTS

| | | |
|---|---|---|
| 8,553,212 B2 | 10/2013 | Jaeger et al. |
| 8,699,756 B2 | 4/2014 | Jensen |
| 2007/0139262 A1 | 6/2007 | Scherzinger |
| 2011/0102255 A1 | 5/2011 | Scherzinger |
| 2015/0092181 A1 | 4/2015 | Nishita |
| 2017/0276485 A1 | 9/2017 | Pettersson et al. |
| 2019/0086206 A1 | 3/2019 | Nishita |

FOREIGN PATENT DOCUMENTS

| | | |
|---|---|---|
| DE | 11 2006 003 390 B4 | 5/2019 |
| EP | 2 141 450 A1 | 1/2010 |
| EP | 2 219 011 A1 | 8/2010 |

(Continued)

OTHER PUBLICATIONS

Extended European Search Report dated Feb. 14, 2023 as received in Application No. 22187882.0.

*Primary Examiner* — Y Lee
(74) *Attorney, Agent, or Firm* — Maschoff Brennan

(57) ABSTRACT

An automatic stationing functionality of a geodetic survey instrument. The survey instrument comprising a targeting unit configured to provide a targeting data measurement, an inertial measurement unit (IMU), an imaging sensor unit configured for providing the functionalities of a visual positioning system (VPS), a communication interface configured to receive a design data comprising position information of reference markers in the environment, and a computing unit. The automatic stationing functionality being configured for calculating a coarse pose of the instrument based on the IU and/or the VPS pose data, selecting a plurality of reference markers to be targeted based on the coarse pose and the design data, and determining a fine pose of the instrument based on the targeting data measurement of the plurality reference markers.

10 Claims, 6 Drawing Sheets

(56) References Cited

FOREIGN PATENT DOCUMENTS

| | | |
|---|---|---|
| EP | 2 404 137 A1 | 1/2012 |
| EP | 3 062 283 A1 | 8/2016 |
| EP | 3 222 969 A1 | 9/2017 |
| EP | 3 779 357 A1 | 2/2021 |
| EP | 3 779 359 A1 | 2/2021 |

AUTOMATIC, STATIONING OF A GEODETIC SURVEY INSTRUMENT BASED ON REFERENCE MARKER DATABASE

FIELD OF THE DISCLOSURE

The present disclosure relates to a geodetic survey instrument comprising a targeting unit, an inertial measurement unit (IMU), an imaging sensor unit configured for the functionality of a visual positioning system (VPS), and a computing unit. The geodetic survey instrument exhibits an automatic stationing functionality based on the coarse pose of the survey instrument and the localization of references markers according to a design data. The present disclosure further relates to a stationing method of the survey instrument and a computer program product based on it.

BACKGROUND

To gain information from static or moving objects according to the geodetic accuracy standards, in particular with centimetre precision or better, geodetic survey instruments, in particular total stations, tachymeters and motorized theodolites, are commonly used. Such geodetic survey instruments are configured to provide spherical and/or derived Cartesian coordinates of a single point or a plurality of single points according to the geodetic accuracy standards.

Total stations are a common class of geodetic survey instruments. By the way of example total stations are presented from here on as representatives of generic geodetic survey instruments. The specific features of other types of geodetic survey instruments might be applied accordingly. Total stations essentially comprise a targeting unit, single point distance measuring elements, in particular laser rangefinders, and angle sensors, with accuracy in the range of angular seconds. From this point on, a "targeting unit" is understood to be an ensemble that can sight, aim, and measure one or more individual point. The targeting unit might be a single, integrated component of the total station, in particular co-axial sighting and single point distance measuring elements, in particular laser rangefinders. Contemporary total stations are typically characterized by a compact design comprising the targeting unit, computing, controlling and data storage units in a single portable device. From this point on "computing unit" is understood to be a system further comprising the controlling and data storage units.

To sight and target a designated target point generic total stations are equipped with a telescopic sight such as optical telescope. The telescopic sight can be aligned with the target point by pivoting and tilting the targeting unit. By way of example, such a sighting device is described in EP 2 219 011. The spherical coordinates of the target points are then determined. A distance of the targeted object is determined by a range finding method, in particular by a laser rangefinding, while elevation and azimuth angles might be derived from angle readings provided by the angle sensors comprised by the survey instrument, in particular comprised by the targeting unit. By the way of example, unless otherwise specified, distance from the survey instrument will mean distance from the targeting unit. By the way of example azimuth angle, unless otherwise specified, is an angle to a reference direction, in particular to the north direction, while elevation angle is an angle to the horizon, in particular to a calibrated horizon.

Total stations are often used in combination with retroreflective target objects, in particular circular prisms. Objects equipped with retroreflective targets are known as cooperative targets, while other targets, in particular diffusely reflective targets, are known as non-cooperative targets. Often the target object cannot be targeted with a precision required for geodetic measurements despite the 30× optical magnification. For that purpose contemporary total stations might be equipped with an automatic target search and tracking function for cooperative targets. EP 2 141 450 discloses a measuring device with such function.

Contemporary total stations can also reference the instrument to an external coordinate system by precisely recording the reference marks in the environment. Upon determining such an external coordinate system all coordinative operations may be referenced to this external or a global coordinate system. Typical total stations are also equipped with a GNSS receiver. However without an appropriate support infrastructure, e.g. base stations at referenced positions, the accuracy of the GNSS receivers are not fulfilling the geodetic accuracy requirements. Consequently they can only provide a coarse pose data. Furthermore GNSS receivers require the presence of GNSS signals, which make them ill-suited for indoor survey tasks.

Contemporary total stations may also be equipped with a set of wireless modules which enable them to communicate with different types of external units. A non-exclusive list of external units comprise another survey instruments, handheld data acquisition devices, field computers or cloud services. In particular total stations may receive a digital model of the environment using the wireless module. EP 3 779 359 discloses a survey instrument comprising an appropriate interface for receiving a digital model of the environment and a method of referencing the survey instrument to the digital model.

Referencing the total station is typically a cumbersome, manual work. At least a coarse pose of the total station, this might be provided by a GNSS receiver, and the absolute position of the visible reference markers in the proximity has to be known. Ideally the reference markers are reference markers of the Geodetic Control Network. The absolute pose of the survey instrument is then derived by targeting and marking the said reference markers. This is typically carried out by manual targeting or by scanning the environment to seek and target such reference markers. E.g. EP 2 404 137 discloses such a scanning method.

On the other hand during a typical survey task, in particular an indoor survey or surveying a complex site e.g. a construction yard, targeting and measuring all the points to be surveyed is not possible from one referenced site. This necessitates the relocation of the survey instrument. Moreover, the relocation of the instrument often takes place along random trajectories, especially in the case of indoor survey. This means that pose of the instrument must be determined on multiple occasion.

For many survey tasks, especially an urban or indoor survey, even obtaining the coarse pose of the instrument is difficult, since e.g. GNSS signals might not be present at every desirable surveying locations. The prior art contains multiple methods of localizing the geodetic survey instrument under such conditions e.g. DE 11 2006 003 390, US 2011/102255, EP 3 222 969 disclose stationing approaches. These stationing methods on the other hand involve the manual measurement of one or more reference point using a prism pole or an equivalent auxiliary tool.

Coarse positioning systems based on system intern sensors like IMU or VPS are especially advantageous since they can provide at least a coarse pose information. The utilization of IMU-s to aid the coarse positioning of the instrument is known in the prior art, e.g. US 2019/086206 discloses a system incorporating an IMU. IMU-s on the other hand are known to drift even during a relatively short timeframe of less than an hour, thus they have to be referenced regularly.

VPS provide a coarse pose of the system by analyzing the visual information of the surroundings of the instrument. The VPS might be based on structure from motion (SfM), simultaneous localization and mapping (SLAM) or any other alternative method. The application of VPS in combination with geodetic survey instruments are known in the prior art e.g. EP 3 062 283 discloses such a system. Such systems can provide coarse positioning without external signals. On the other hand since they are based on the interpretation of visual data, such systems are error-prone in an environment with ambiguous features, e.g. a construction yard with many close to identical looking features, or where the contrast is changing rapidly, e.g. during an indoor survey task.

A visual inertial simultaneous localization and mapping (VISLAM) system is disclosed in EP 3 779 357, i.e. the combination of a SLAM system with an IMU to merge the aspects of the two methods for the coarse positioning of survey instrument. EP 3 779 357 also discloses a referencing of the pose of the survey system to a digital data. The survey system disclosed in EP 3 779 357 is on the other hand based on the creation of a point cloud which is a quite tedious work.

Quite often the survey task involves updating a data provided by a previous survey, e.g. to provide an update on the progress of a construction site. In such environments a plurality of reference markers with known position are already present. These reference markers present an opportunity for a simplified stationing of the survey instrument, wherein the survey instrument could determine the relative position of these markers in respect to its derived coarse pose.

Object of the Disclosure

In view of the above circumstances, the object of the present disclosure is to provide a geodetic survey instrument with a simplified and more efficient stationing.

A further object of the present disclosure is to provide an improved stationing in an environment, wherein no GNSS or similar positioning signals are available.

SUMMARY

The present disclosure relates to a geodetic survey instrument comprising a targeting unit, an IMU, an imaging sensor unit, a communication interface and a computing unit. The geodetic survey instrument is man-portable in the sense that the survey instrument is not arranged to a vehicle, in particular a UAV, a transport vehicle or a car, at least during the measurements. Furthermore, while the survey instrument might be arranged to a transport vehicle during the relocation, the primary mode of relocating the survey instrument is being carried by an operator.

The targeting unit is configured to target objects in an environment and to provide a targeting data measurement of the targeted object. The targeting data might be a targeting direction or coordinates of the targeted object. From here on the embodiments utilizing coordinate measurements are described in more details, the specific features of embodiments utilizing targeting direction measurements or other types of targeting data might be applied accordingly. The targeting unit might be a single, integrated component of the total station, in particular co-axial single point distance measuring elements, in particular laser rangefinders, and a sighting unit. The targeting unit might comprise angle sensors to provide angle readings on the orientation of the targeting unit. The targeting unit might receive angle readings from further sensor components of the survey system.

The IMU is configured to recognize a relocation of the instrument and to provide a tracking of IMU pose data giving information of a pose change of the instrument. The IMU might comprise an electronic compass.

The imaging sensor unit is configured for providing the functionalities of a VPS, and further configured to recognize a relocation of the instrument and to provide a tracking of VPS pose data giving an information of a pose of the instrument relative to the environment. The VPS might be based on SfM, SLAM or any other alternative method.

The imaging sensor unit might comprise a single camera module with wide angle field of view. The imaging sensor unit might comprise independent camera modules arranged to the survey instrument independently of each other. The imaging sensor unit might be permanently arranged to the survey instrument. Alternatively the imaging sensor unit might be temporarily arrangable or might comprise subunits which are temporarily arrangable to the survey instrument.

The IU and the imaging sensor unit might be two independent systems. The IU might be an auxiliary system of the imaging sensor unit, i.e. the IMU pose data might be used to correct the VPS pose data if the tracking of the visual features are lost. Alternatively, the imaging sensor unit might be an auxiliary system of the IMU and the VPS pose data might be used to correct the drift of the IMU. The instrument might comprise further positioning sensors to correct the IMU and/or the VPS pose data. Needless to say that both the IMU and the VPS pose data might be corrected/resetted by referencing the absolute pose of the survey instrument.

The communication interface is configured to receive a design data of the environment, wherein the design data comprises position information of reference markers in the environment. The communication interface might be a wireless interface, in particular a WLAN or a Bluetooth interface. The communication interface might be a wired interface of equivalent functionality.

The design data might be a computer aided design (CAD) or a building information model (BIM). The design data might utilize similar or alternative standards. The design data might be a map. The design data might comprise further data, in particular navigation information, or the absolute positions of features other than reference markers. The design data might comprise data from previous measurements.

The computing unit is configured to store a pose of the instrument, to refer the pose of the instrument to the design data, to provide targeting commands for the targeting unit, to read the coordinates provided by the targeting unit, to read the VIS and IMU pose data. Needless to say that the computing unit is configured to store, process and update the design data.

The fine pose of the instrument is a referenced pose, in particular georeferenced absolute pose, non-referenced pose from here on will be referred to as coarse pose. The coarse pose of the instrument can also be merged with the design data similarly to the fine pose.

The geodetic survey instrument comprises an automatic stationing functionality, the automatic stationing functionality is configured for providing the automatic execution of the steps of 1.) recognizing the relocation of the instrument by the IMU and/or imaging sensor unit, 2.) calculating a coarse pose of the instrument based on the tracking of the IMU and/or the VPS pose data, 3.) selecting a plurality of reference markers to be targeted based on the coarse pose and the design data by the computing unit, 4.) executing the targeting data measurement of the plurality reference markers by the targeting unit, and 5.) determining a fine pose of the instrument based on the targeting data measurement of the plurality reference markers. The targeting data measurement might be a coordinate measurement and the plurality of reference markers might comprise two reference markers. The fine pose might be determined utilizing a Helmert-transformation. The targeting data measurement might be a targeting direction measurement and the plurality of reference markers might comprise three reference markers. The fine pose might be determined by a position resection. The present disclosure is not limited to any specific embodiments of targeting data measurements.

The imaging sensor unit might be configured for a SLAM. The SLAM can comprise a progressional capture of a series of images from at least one, preferably more, camera of the imaging sensor unit. The SLAM algorithm is therein comprise the identification of prominent visual features, the tracking and triangulation of the said visual features. The selection of the prominent visual features might be dependent on an environment and a survey task. E.g. for an indoor survey prominent visual features might be corners of the room, doorframes, power sockets, furniture elements, construction materials, screws or rivets. The person skilled in the art can provide a similar or alternative list depending on the environment and the survey task.

The relocation of the instrument might be carried out along an essentially random path. The relocation might follow a 3D path, e.g. part of the relocation path might be along a stairway. The relocation path might contain a pause or an oscillatory phase, e.g. when the operator stops to open a door. While very long relocation paths might cause a potential drift of the IMU and/or the VPS, the present disclosure does not place any limit on the possible relocation paths.

The coarse pose of the instrument might be calculated solely from the IMU pose data, solely from the VPS pose data or from a composite data based on both the IMU and the VPS pose data. The IMU pose data might be augmented by the VPS pose data or vice versa. The survey instrument might comprise further positioning sensors providing further coarse pose data. The further coarse pose data might be used to augment the IMU and/or the VIS coarse pose data.

The targeting unit might comprise a sighting unit. The field of view of the sighting unit might allow the sighting and targeting the reference markers without further target searching step. This allows an especially time efficient stationing of the instrument. Nevertheless, the present disclosure is not limited to cases where the reference markers are sighted without any target searching step. On the contrary, applying the present disclosure might be beneficial in these cases as at least a shortened target searching step might be possible owing to the estimated direction of the reference markers relative to the coarse pose of the instrument.

In some embodiments the survey instrument further comprises a reference marker recognition functionality for an identification of reference markers with known absolute positions in the environment. The reference marker recognition functionality might be based on image analysis. The reference marker recognition functionality might be based on active methods, in particular on acquiring a reflected search radiation. The reference marker recognition functionality might be a multistage process, in particular wherein the two targeting angles are searched in a sequential manner. The reference marker recognition functionality might be comprised by the targeting process. The imaging sensor unit might also utilize the reference marker recognition functionality to reference the VPS. Referencing the VPS by utilizing recognized reference markers is especially beneficial as it might lead to a reduced drift of the VPS pose data, and with that a variance of the coarse pose might be reduced.

In some embodiments the automatic stationing functionality further comprises 1.) providing an estimate on the variance of the coarse pose, 2.) providing a search radius for the reference marker recognition functionality based on the estimate on the variance of the coarse pose. The estimate on the variance of the coarse pose might be based on the specification of the VPS/IMU and further based on the time passed since the last referencing steps. The estimate on the variance of the coarse pose might be based on previous measurement data. The reference marker recognition functionality might use a search muster, the present disclosure is not limited to the utilization of any particular search muster. The person skilled in the art could apply the present disclosure in combination with any implementation of possible search musters.

In some embodiments the survey instrument further comprises 1.) a base unit, 2.) a support unit mounted on the base unit and configured for being rotatable relative to the base unit by a motorized rotation axis, and 3.) a first angle sensor configured for measuring a rotation angle of the support unit. The targeting unit is mounted on the support unit and is tiltable around a motorized tilting axis. The instrument comprises a second angle sensor configured for measuring the tilting angle of the targeting unit relative to the support unit. The targeting unit comprises a beam exit of a distance measuring beam of a distance meter, in particular of a laser distance meter, defining a measuring axis, and configured for measuring a distance of the targeted feature. The coordinates of the targeted reference marker might be derived from the distance measured by the distance meter and the tilting and rotation angles.

The present disclosure is not limited to survey instruments comprising a distance meter. On the contrary, the present disclosure can be realized solely utilizing targeting direction measurements. For survey instruments without distance meters the measuring axis might be defined by a targeting axis, in particular an optical axis, of the targeting unit. Similar and alternative survey instruments are known by the person skilled in the art.

In some embodiments IMU is located in the base. Locating the IMU in the base is especially beneficial, as the base is a stable, inert position. This might allow the determination of the drift of the IMU. Furthermore being located in the base, might allow a recalibration of the IMU. In spite of these benefits the present disclosure is not limited to embodiments where the IMU is located in the base unit.

In some embodiments the survey instrument comprises 1.) a search radiation emitter, configured to emit a search radiation, 2.) a reflected radiation receiver, configured to detect reflected search radiation, and 3.) a search evaluation unit configured to identify a new reference marker by analyzing the reflected search radiation, and to provide a coarse targeting angle information of the new reference marker, wherein the targeting angle information provides the rotation and tilting angles of the targeting unit relative to the base unit to target the new reference marker. The survey instrument is further configured to carry out a reference search functionality. The reference search functionality comprises 1.) emitting the search radiation by the search radiation emitter, 2.) pivoting the search radiation, by rotating the survey instrument and/or by tilting the targeting unit, 3.) identifying the new reference marker and providing the coarse targeting angles of the new reference marker by the search evaluation unit. The survey instrument is further configured to provide the absolute coordinates of the new reference marker by measuring them with the targeting unit and to update the design data with the measured absolute position of the identified new reference marker. The reference search functionality might be utilized with other functionalities, in particular with reference marker recognition functionality.

In some embodiments the communication interface is further configured to send the updated design data to further survey instruments, further computing units or to a cloud server.

In some embodiments the survey instrument comprises a further positioning system configured to provide a tracking of further coarse pose data. The further positioning system comprises at least one of 1.) a GNSS receiver, 2.) a WLAN positioning unit, 3.) a cellular positioning unit, and 4.) Bluetooth positioning unit. The automatic stationing functionality further comprises the updating of the coarse pose of the instrument based on the tracking of the further coarse pose data. The further coarse pose data might be utilized to correct the IMU and/or the VPS pose data. Utilizing the further coarse pose data is beneficial as it does not accumulate drift over the time, unlike to the IMU or the VPS. Nevertheless, the present disclosure might be utilized if the further coarse pose data is not available due to the circumstances, in particular shadow effects. The present disclosure might be utilized by survey instruments not comprising the above further positioning system.

In some embodiments the imaging sensor unit is further configured to provide identification of the reference markers and further configured to utilize the identified the reference markers for providing the VPS pose data. Reference markers, in particular retroreflectors are designed to be well recognizable, i.e. they typically have high contrast to the environment. Especially beneficial is the utilization of reference markers with known position. Since their absolute position is known from the design data the drift of the VPS pose data might be reduced by the utilization of such reference markers.

In some embodiments the survey instrument is configured for at least one of: 1.) automatic recognition of a survey task and the environment by analyzing the design data, 2.) reception an operator input on the survey task and the environment. Knowing the survey task and the environment allows the optimal selection of prominent visual features for the VPS.

In some embodiments the computing unit is further configured to 1.) receive an operator input on a requested second location, 2.) calculate a calculated visibility of a set of reference markers in the proximity of the requested second location, 3.) calculate a proposed second location for the instrument based on the calculated visibility of the set of reference markers in the proximity of the requested second location, 4.) provide guidance instructions for the operator to reach the proposed second location. The computing unit might be further configured to provide guidance instruction with respect to the design data, in particular providing a path optimized for carrying the survey instrument.

In some embodiments the survey instrument is configured to be mounted on a transport vehicle. The survey instrument according to the present disclosure is configured to be man portable. The primary mode of relocating the survey instrument, in particular when the relocation path is walkable, but not passable to a vehicle, is being carried by the operator. Nevertheless for certain survey tasks, in particular for outdoor surveys, it might be beneficial to mount the survey instrument on a transport vehicle for a faster and less burdensome relocation. The transport vehicle might be configured to exchange data with the survey instrument, in particular data regarding the pose of the survey instrument.

The disclosure further relates to a method for identifying a fine pose of a geodetic survey instrument. The method comprises the steps of 1.) recognizing the relocation of the instrument by the IMU and/or imaging sensor unit, 2.) calculating the coarse pose of the instrument based on the IMU and/or VPS pose data, 3.) selecting a plurality of reference markers to be targeted based on the coarse pose and the design data, 4.) executing the targeting data measurement of the plurality reference markers by the targeting unit, and 5.) determining a fine pose of the instrument based on the targeting data measurement of the plurality reference markers. The targeting data measurement might be a coordinate measurement and the plurality of reference markers might comprise two reference markers. The fine pose might be determined utilizing a Helmert-transformation. The targeting data measurement might be a targeting direction measurement and the plurality of reference markers might comprise three reference markers. The fine pose might be determined by a position resection. The present disclosure is not limited to any specific embodiments of targeting data measurements.

In some embodiments the method further comprises, 1.) targeting at least one new visible reference marker, wherein the absolute position of the reference marker is not comprised by the design data, 2.) providing the absolute position of the least one new visible reference marker, by measuring its coordinates, 3.) updating the design data with the absolute position of the targeted at least one new visible reference marker. This is especially beneficial if the survey task is e.g. to document the progress of a construction work. New reference markers with known position might have been placed beforehand. New reference markers might have been placed as a part of the actual survey task, e.g. to survey the newly constructed part of a building. The new reference marker might be utilized in the next relocation step as previously known reference marker. The coordinates of the new reference markers might be measured automatically, the new reference marker might be identified automatically utilizing a reference search method. The present disclosure is however not limited to cases where new reference markers are automatically recognized, targeted and measured. On the contrary, the design data might be updated following a survey step carried out by an operator. The updated design data might be utilized for the subsequent automatic stationing of the survey instrument at a subsequent survey location.

In some embodiments the method further comprises updating the coarse pose of the instrument is based on the further coarse pose data. Where available GNSS, cellular network, WLAN or Bluetooth positioning signal represent a further, drift-free source of a coarse pose. While the present disclosure can be fully applied where no such external positioning signals are available, it might benefit from the application of the external positioning signals. The further coarse pose data might also be applied to update the IMU and/or the VPS pose data.

In some embodiments the method further comprises 1.) providing a weighting function for the visual features on the basis of the survey task and an environment information, wherein the survey task and the environment information are provided by at least one of a.) automatic recognition of the survey task and the environment, and b.) operator input on the survey task and the environment, 2.) utilizing the visual features with the highest weighting functions for VPS.

In some embodiments the method further comprises carrying out the reference search function and updating the design data with the measured absolute position of the identified new reference marker. Instead of manually targeting a previously not measured reference marker some embodiments of the survey instrument might comprise a search functionality to automatically sight and target reference markers. The new reference marker might be utilized in the next relocation step as previously known reference markers.

In some embodiments the method further comprises providing an estimate on the variance of the coarse pose, providing a search radius for the reference marker recognition functionality based on the estimate on the variance of the coarse pose. Both the IMU and VPS are known to drift, if such drifts are not reseted either by stationing of the instrument or via the further coarse pose data, the drift will grow over time. After sufficiently long time the coarse pose of the instrument is so far away from the real pose that locating the reference markers might not be possible without a target search. An estimate of the variance, e.g. on the basis of the nominal or historical drift of the IMU and/or the VPS, might be utilized to determine the probability whether the reference marker will be sighted by the sighting unit. For the cases where such events are unlikely the reference marker recognition functionality might be activated with a search radius corresponding to the estimated variance.

The disclosure further relates to a computer program product for the survey instrument which, when executed by the computing unit, causes the automatic execution of the steps of a selected embodiment of the stationing method.

BRIEF DESCRIPTION OF THE DRAWINGS

By way of example only, specific embodiments will be described more fully hereinafter with reference to the accompanying figures, wherein.

DETAILED DESCRIPTION

Figure 1:
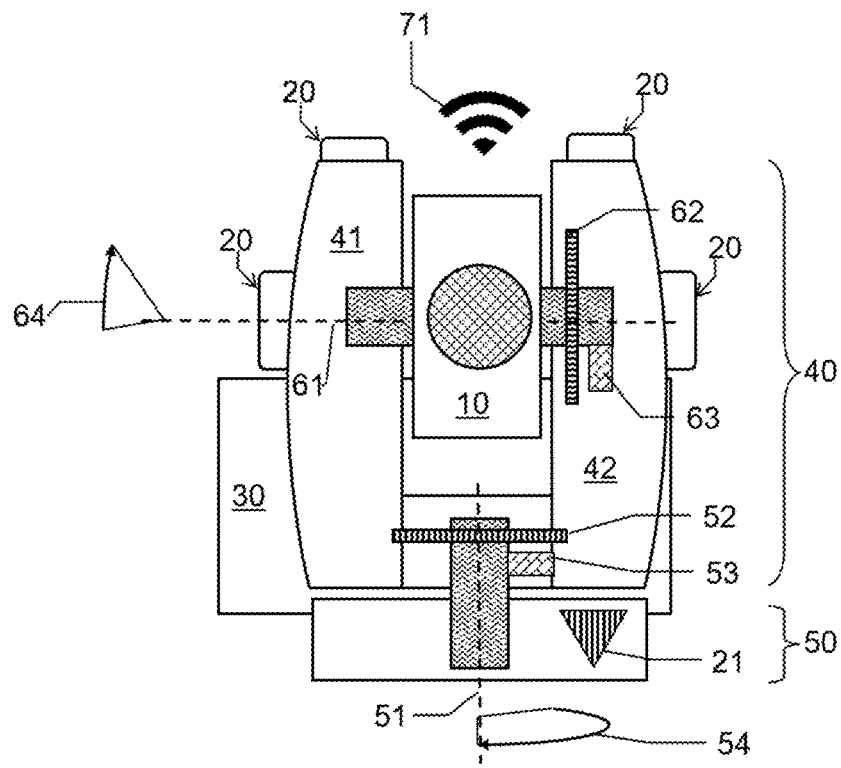
FIG. 1 shows the schematics of an embodiment of a geodetic survey instrument.

FIG. 1 shows a schematic depiction of an embodiment of the survey instrument 40 comprising the targeting unit 10, the set of positioning sensors, the imaging sensor unit 20 and the computing unit 30.

The main frame of the survey instrument 40 comprises a first column 41 and a second column 42. The targeting unit 10 is attached to both columns 41,42 so that it is tiltable around a tilting axis 61. The tilting of the targeting unit 10 is preferably realized by a motorized axis 62. Manual tilting around the tilting axis 61 may also be possible under certain circumstances. The survey instrument 40 comprises a first angle sensor 63 configured to measure a tilting angle 64.

In the depicted embodiment of the survey instrument 40 is configured to be mounted on a base 50 and being rotatable about a rotational axis 51. The rotation axis 51 might be a vertical axis during the calibration and measurement operations. The survey instrument 40 may be rotated manually under certain circumstances, or preferably by a motorized axis 52. The survey instrument 40 comprises a second angle sensor 53 configured to measure a rotation angle 54 of targeting unit relative to the base 50. The tilting 64 and rotational angle 54 retrieved by the first 63 and second angle sensors 53 are transferred to the computing unit 30. The computing unit 30 provide driving commands for the motorized axes 52, 62 in order to target a selected feature with the targeting unit 10.

In the depicted embodiment of the survey instrument 40 comprises the imaging sensor unit 20 as a camera array arranged to different locations in the frame. Other embodiments of the imaging sensor unit 20, in particular an imaging sensor unit arranged into a single device, may also be possible. The imaging sensor unit 20 is configured for a VPS functionality. The VPS might be based on SLAM, SfM or any other alternative methods.

In the depicted embodiment of the portable integrated survey instrument 40 comprises a wireless interface 71 as the communication interface. The wireless interface 71 or a wired interface with equivalent functionality is configured to receive the design data of the environment. The design data comprises absolute position of reference markers. The computing unit 30 is configured reference the pose of the survey instrument to the received data. The wireless interface 71 or a wired interface with equivalent functionality might provide measurement and/or design data directly or indirectly, in particular utilizing a cloud server, to further survey instruments 40 or computing units 30.

The survey instrument 40 comprises an IU 21. The survey instrument 40 might comprise further positioning sensors, in particular positioning sensors based on GNSS, or the wireless unit 71. In the depicted embodiment the IMU 21 is integrated to the base 50. Needless to say, that the person skilled in the art can introduce other placement of the positioning sensor. In particular, the IMU 21 might be integrated to the survey instrument 40, the sensors comprised by the IMU 21 might be distributed such that one or more sensors are integrated to the survey instrument 40 and one or more sensors are integrated to the base 50. Alternatively, at least a part of the sensors from the IMU might be arrangeable to survey instrument 40 or to the base 50 in a temporary fashion.

Figure 2:
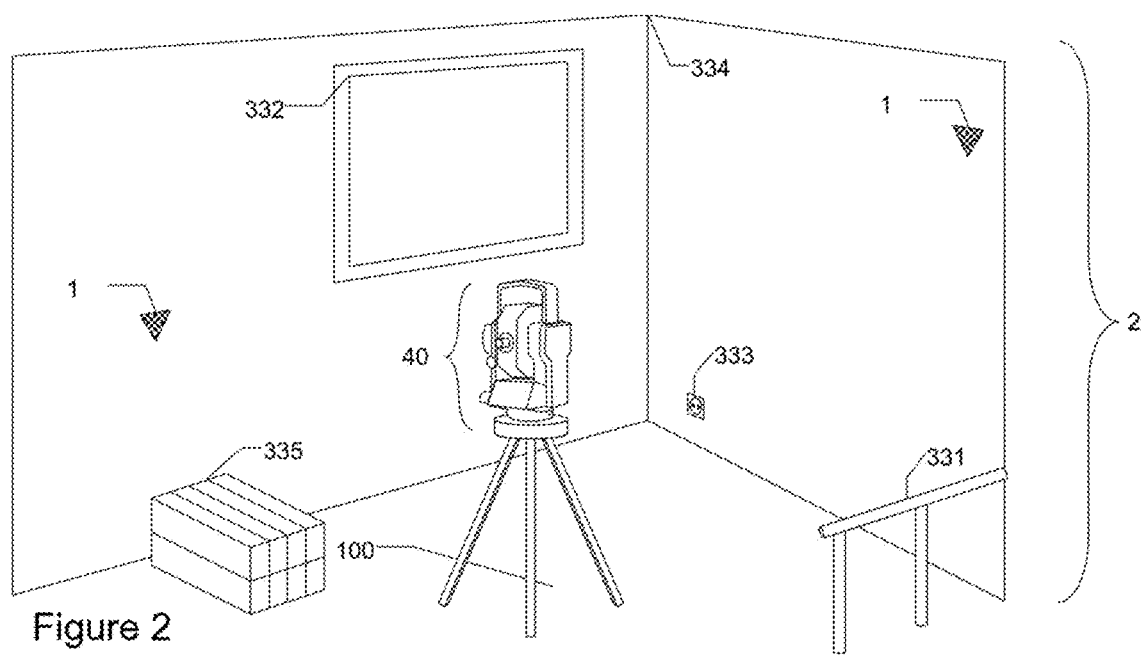
FIG. 2 shows an environment containing reference markers.

FIG. 2 shows the environment 2 containing visual features 1,331,332,333,334,335. The environment 2 in the depicted example is an indoor environment. The present disclosure is no way limited to indoor environments and can be equally applied to outdoor, or mixed in- and outdoor environments. The appropriate visual features might be chosen according to the specific environment 2. The survey instrument 40 may automatically recognize the survey task and the environment 2. The survey instrument 40 may receive operator input on the survey task and the environment 2. The environment 2 comprises a plurality of reference markers 1 with georeferenced absolute positions. The pose 100 of the survey instrument 40 is to be referenced.

Figure 3A:
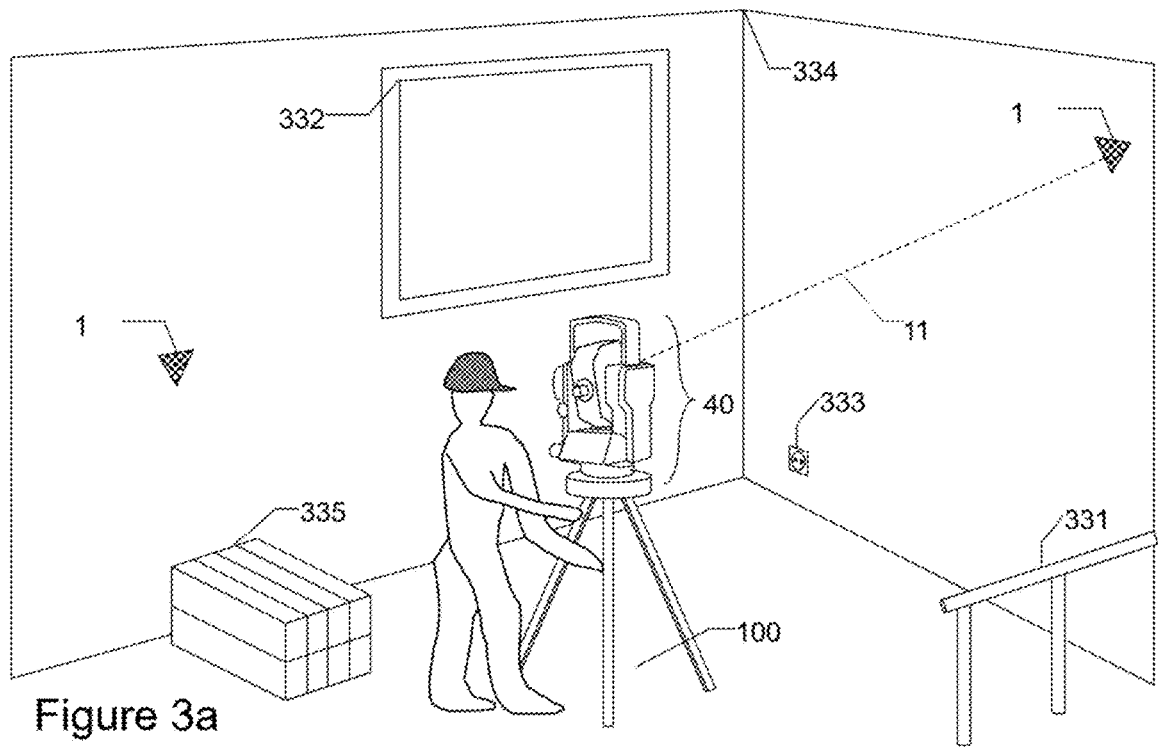
FIG. 3a-b show the prior art referencing the instrument based on manual targeting by an operator.
Figure 3B:
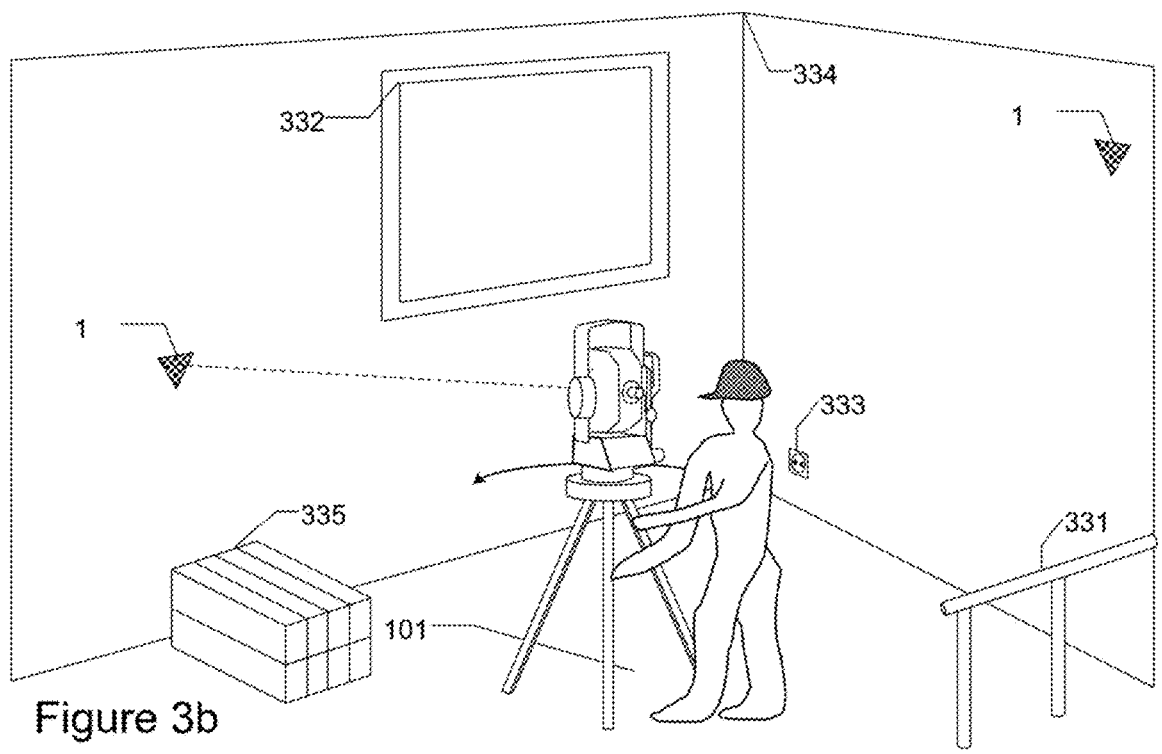

FIGS. 3a and 3b shows a prior art method of referencing the pose 100 of the survey instrument 40 by manually targeting the visible reference markers 1 with referenced absolute positions. Said referencing requires at least two, preferably more reference markers 1 to be targeted and measured by the measuring beam 11 of the survey instrument 40. The referenced or fine pose 101 is then determined by an appropriate method e.g. Helmert-transformation, triangulation/resection. Alternative stationing methods are also known in the prior art. Said method requires manual intervention by the operator, which makes it cumbersome and error prone, i.e. in an environment 2 with a plurality of reference markers 1, the unambiguous identification might be complicated.

Figure 4:
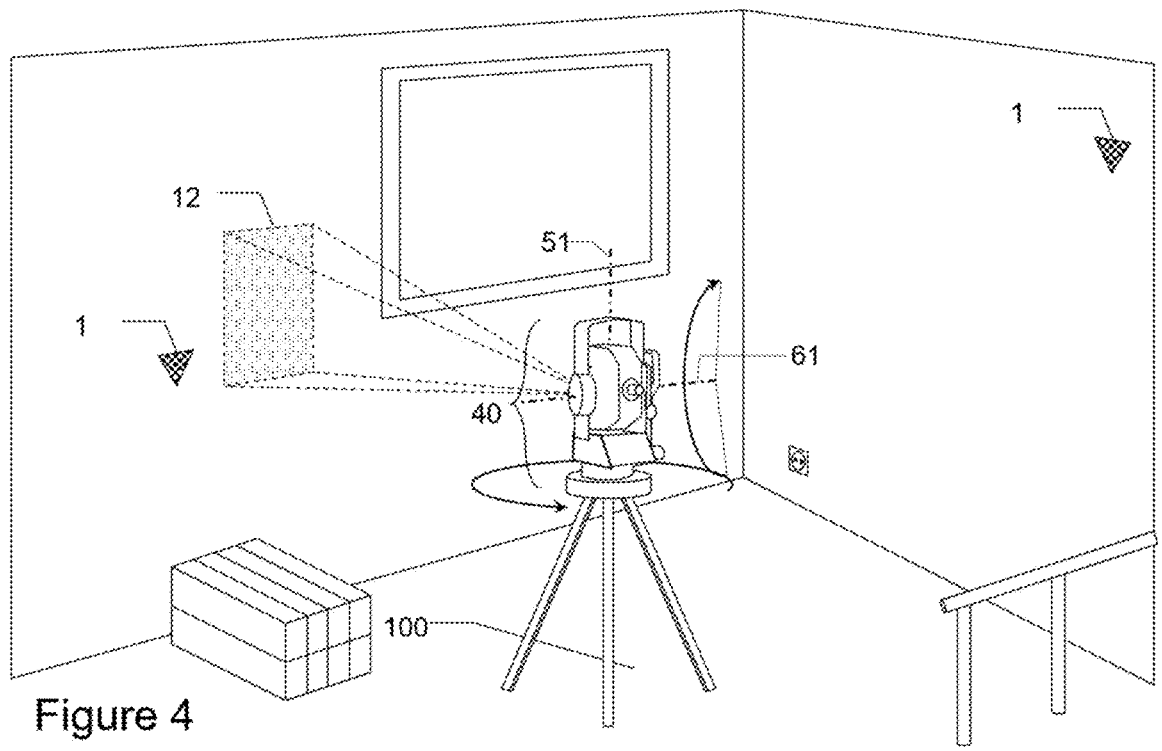
FIG. 4 shows the prior art referencing based on an automated search.

FIG. 4 depicts a generic prior art search method, the search method might be based on visual identification or active search. The search method might be based on an active method utilizing a search beam. The survey instrument 40 recognizes the coarse position of the identified reference markers 1 in the search field of view 12. Since the search field of view 12 is limited the instrument has to be rotated at least around the rotation axis 51 to achieve the required total field of view. A tilting around tilting axis 61 might also be required. The reference markers 1 found are then targeted and measured. Based on the pose 100 of the survey instrument 40 and a database comprising the absolute position of the reference markers 1 a fine pose 101 of the survey instrument 40 might be derived.

While the method depicted in FIG. 4 does not require direct operator action, due to need of a complete scan it is still time intensive. Furthermore the pose 100 of the survey instrument 40 have to be known beforehand at least with the accuracy allowing the unambiguous identification of the reference markers 1.

Figure 5A:
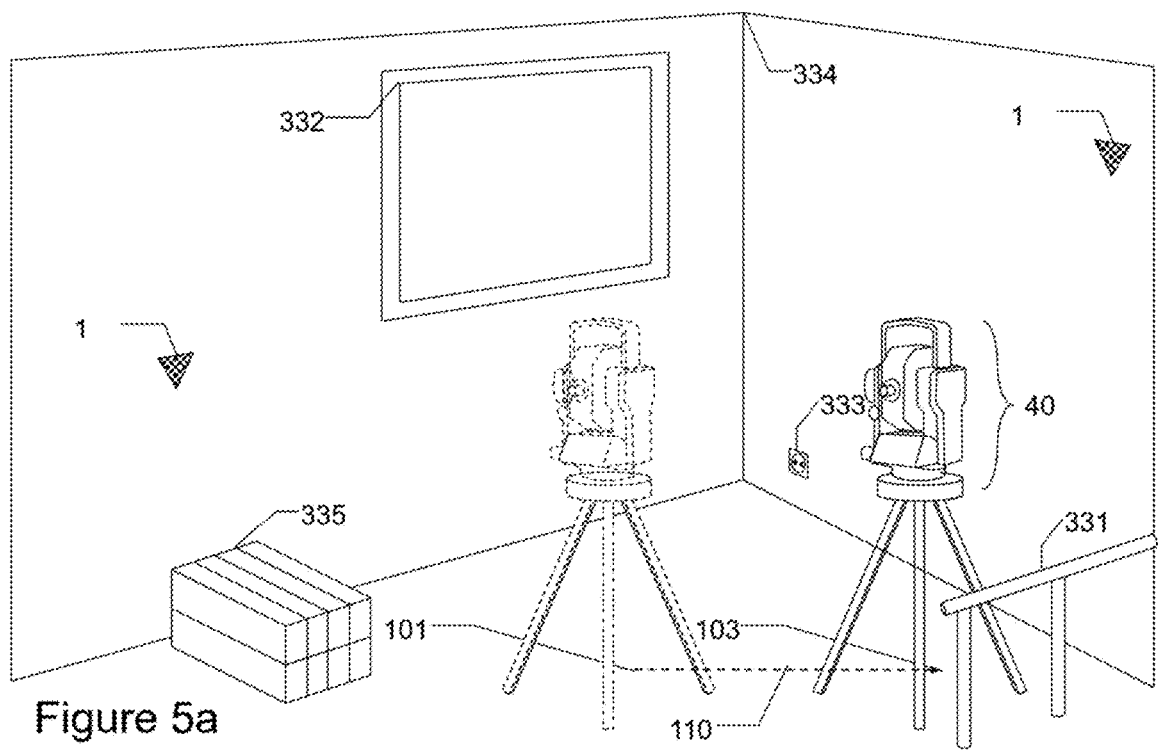
FIG. 5a-b show the relocation from the outside and viewed from the survey system.

FIG. 5*a* show the relocation of the survey system 40 from the fine pose 101 to a new pose 103. For transparency reasons the new pose 103 is depicted as a new survey location with a set up instrument. The new pose 103 might also be an intermediate pose along a relocation trajectory. The new pose 103 is reached along the translation vector 110 from the fine pose 101. The orientation of the instrument 40 might also change during the relocation. For transparency reasons only translational movements are depicted. The specific aspects of a relocation with orientation change might be applied accordingly.

Figure 5B:
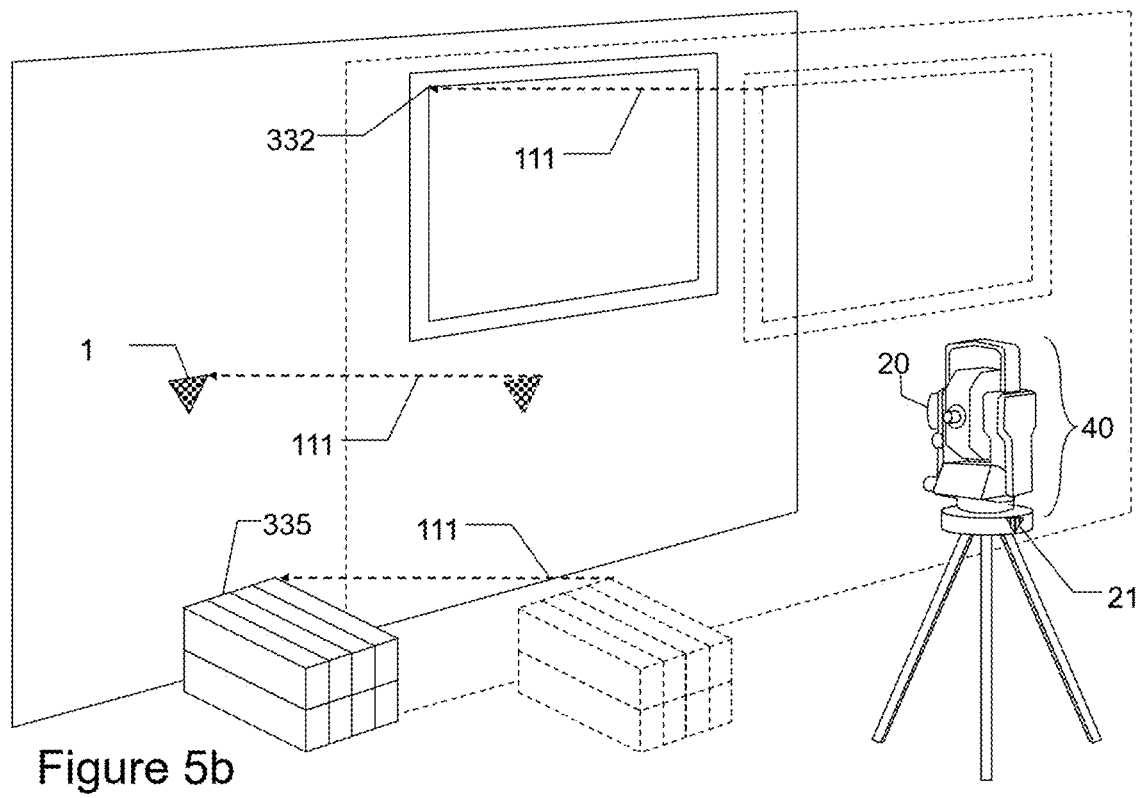

FIG. 5*b* depicts the relocation of the instrument as viewed by the instrument 40, in particular the imaging sensor unit 20. The imaging sensor unit 20 record a series of prominent visual features. Prominent visual features during an indoor survey might be reference markers 1, corners, power sockets, switches, corners of doors/windows 332, railings, construction material 335, etc. For outdoor or mixed in- and outdoor survey tasks a different set of prominent visual features might be more appropriate.

During the relocation of the instrument 40 along a translation vector 110, the position of the visual features 1,332,335 as viewed by the imaging sensor unit change with a translation vector 111. The two translation vectors 110,111 are of equal length and opposite direction. The coarse pose of the survey instrument 40 can be derived from the translation vector 111 observed by the camera. The derivation of the rotation movement is analogous.

Especially for the here depicted indoor survey, the imaging sensor unit 20 might experience difficulties for tracking the visual features 1,332,335. Reasons for that might be masking of the visual features by other object, stark contrast changes in the environment 2 or on the visual features 1,332,335 themselves. For that purpose the survey instrument is equipped with an IMU 21. The IMU 21 can provide the movement information if the tracking of the visual features 1,332,335 is lost as well as provide information to re-establish the tracking of the visual features 1,332,335.

Figure 6A:
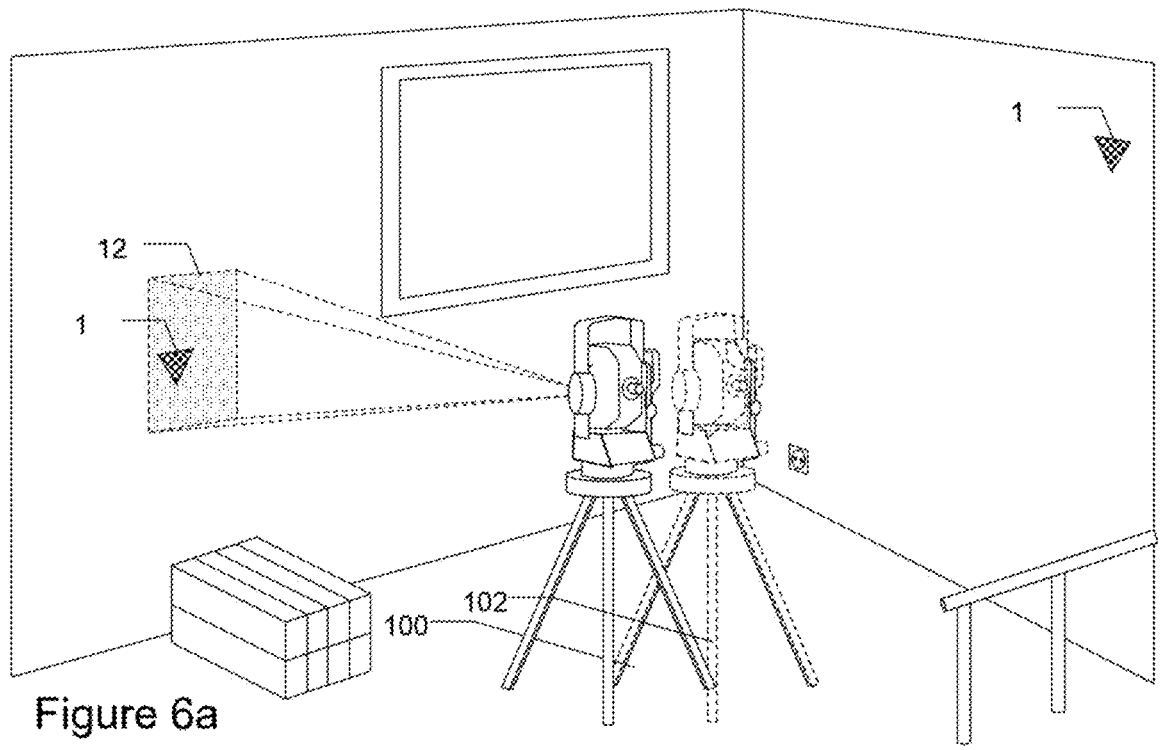
FIG. 6a-d show the referencing.

FIG. 6*a* shows a situation where the pose 100 of the survey instrument is not known with geodetic accuracy. The coarse pose 102 derived from the IMU and VPS data. Based on the coarse pose 102 and digital model of the environment comprising the position of a plurality of reference markers 1 the survey instrument can locate a reference marker 1 utilizing a limited search, in particular no search beyond the sighting and aiming step. The extent of the limited search might be derived from the estimated variance of the coarse pose. The limited search might be selected so that an ambiguity in the identification of the reference marker 1 has the lowest probability.

Figure 6B:
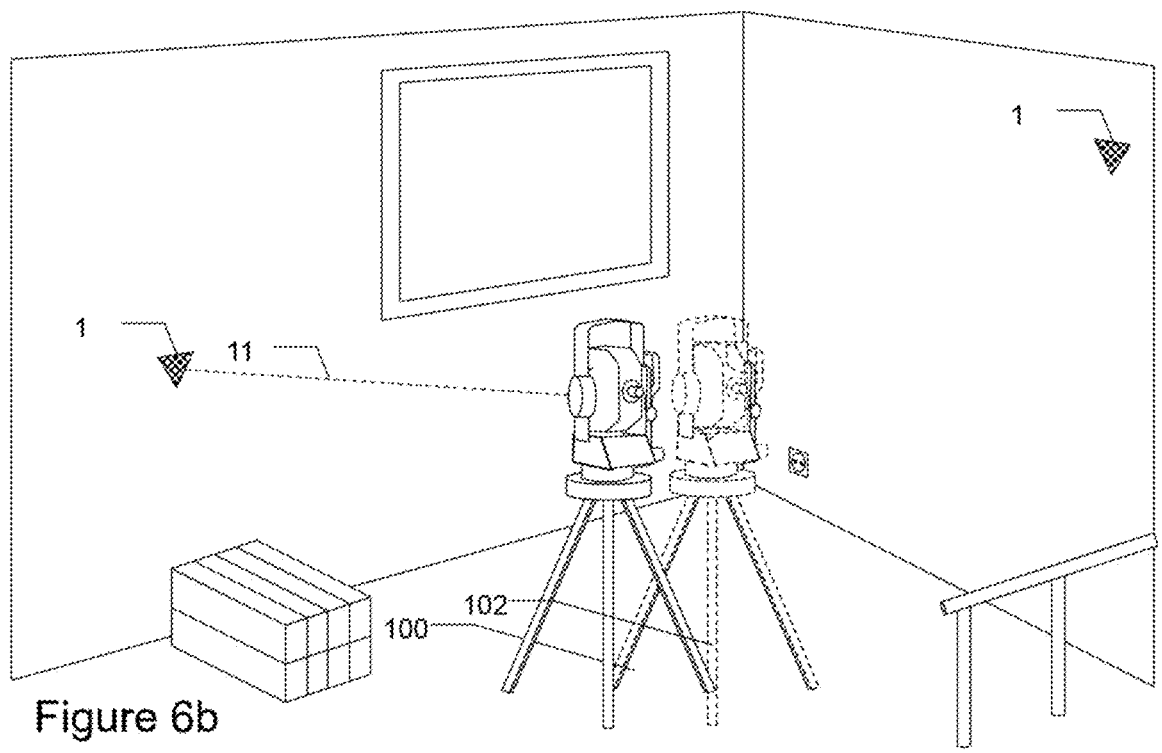
Figure 6C:
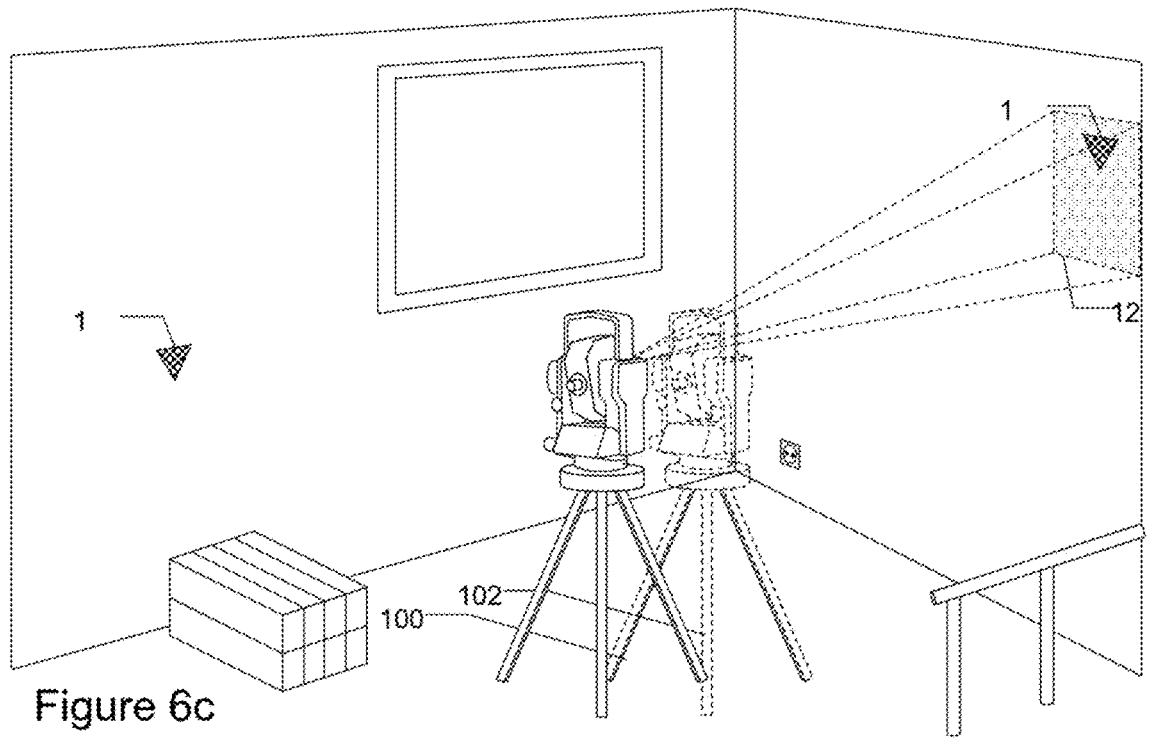
Figure 6D:
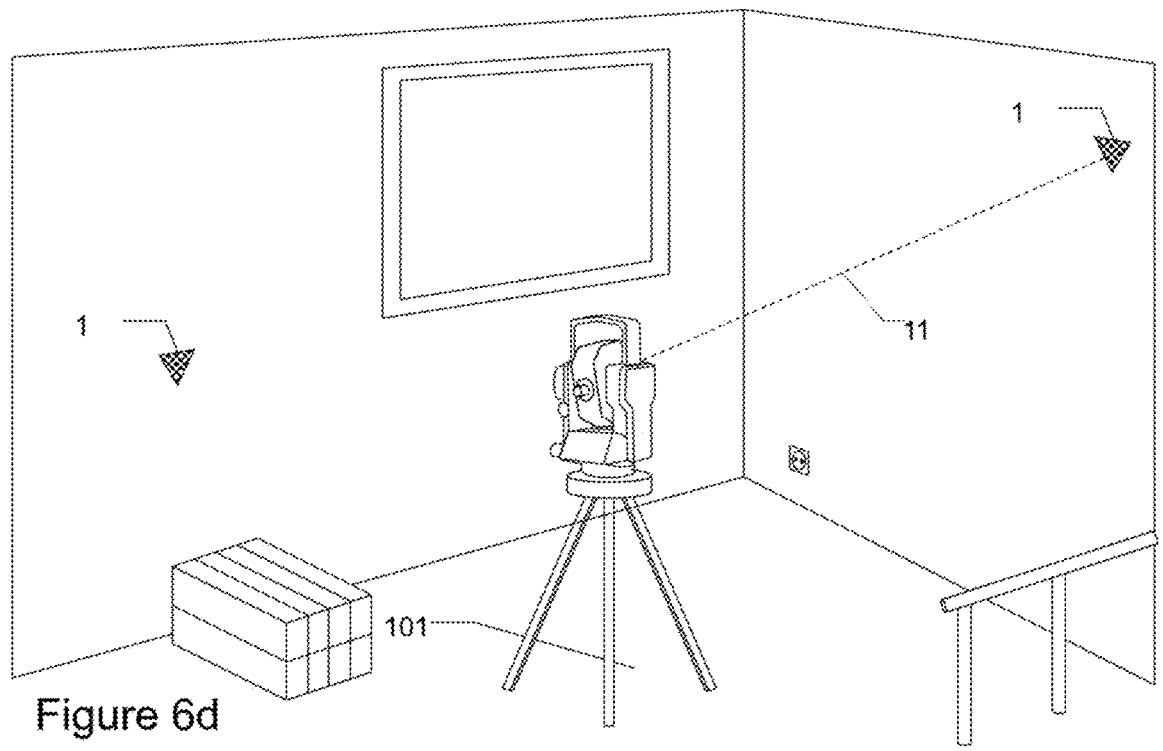

Upon unambiguously identifying the reference marker 1 in the search field of view 12, the reference marker 1 is automatically targeted and measured by the measuring beam 11 as shown in FIG. 6*b*. The fine pose 101 is determined by automatically targeting and measuring at least a second reference marker 1 as shown in FIGS. 6*c* and 6*d*.

Figure 7:
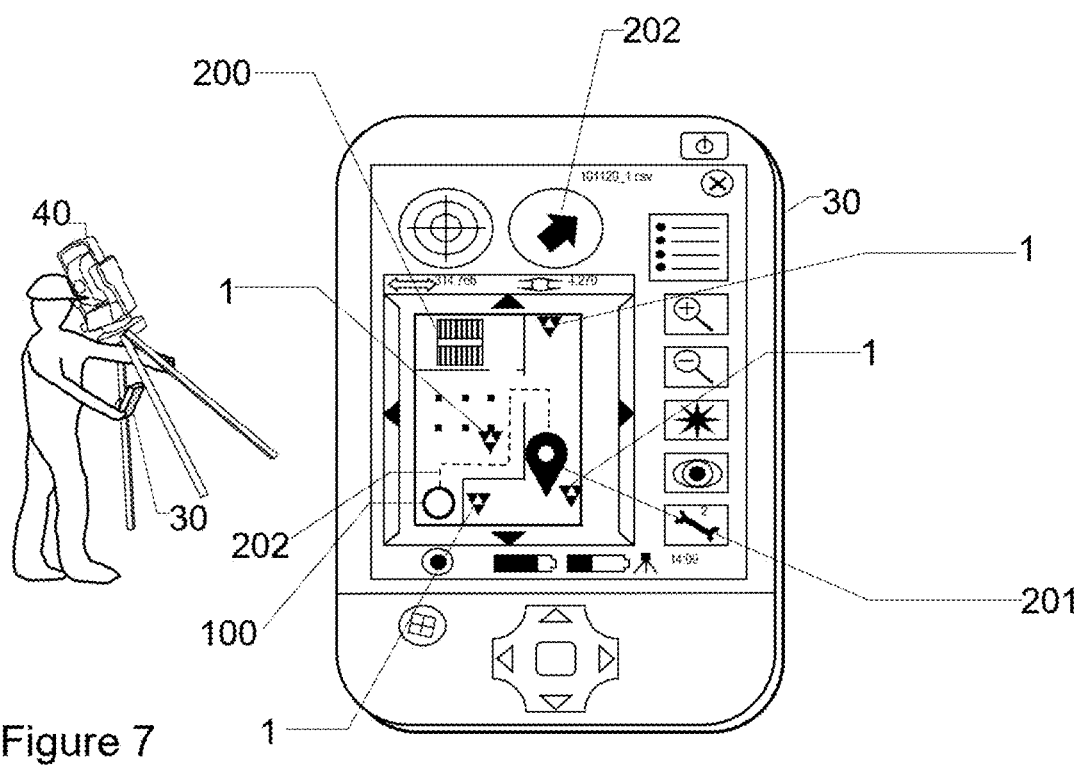
FIG. 7 shows the proposed second location and the guidance instructions for the operator.

FIG. 7 shows an embodiment wherein the computing unit 30 displays the design data 200 of the environment 2. The design data comprises the position of the reference markers 1 in the environment 2. The computing unit 30 might also display the pose 100 of the instrument 40. The pose 100 of the instrument 40 might be a fine pose or a coarse pose. The displayed symbol might be different for fine and coarse poses.

The operator might select a requested second location for the continuation of the survey task. The computing unit 30 calculate a calculated visibility and/or unambiguity the reference markers 1 in the proximity of the requested second location. The computing unit 30 calculate a proposed second location 201 based on visibility and/or unambiguity the reference markers 1. The computing unit 30 might consider other parameters in calculating the proposed second location 201, in particular an accessibility of the proposed second location 201. Needless to say that the person skilled in the art could provide and combine further similar parameters in providing a method for selecting the proposed second location 201.

The computing unit 30 might provide guidance instruction 202 for the operator to reach the proposed second location 201. The guidance instructions 202 might comprise a path plotted in the design data 200, arrows showing the walking direction, or similar visual or alternative, in particular audio, instructions. The computing unit 30 might comprise a handheld unit to display the guidance instructions 202.

Although aspects are illustrated above, partly with reference to some specific embodiments, it must be understood that numerous modifications and combinations of different features of the embodiments can be made. All of these modifications lie within the scope of the appended claims.

The invention claimed is:

1. A geodetic survey instrument comprising,
a targeting unit, configured to target objects in an environment and to provide a targeting data measurement of the targeted object,
an inertial measurement unit (IMU), configured to recognize a relocation of the instrument and to provide a tracking of IMU pose data giving information of a pose change of the instrument,
an imaging sensor unit configured for providing the functionalities of a visual positioning system (VPS), and further configured to recognize a relocation of the instrument and to provide a tracking of VPS pose data giving an information of a pose of the instrument relative to the environment, a communication interface, configured to receive a design data of the environment, wherein the design data comprising position information of reference markers in the environment, and a computing unit, the geodetic survey instrument comprising an automatic stationing functionality, the automatic stationing functionality being configured for providing the automatic execution of the steps of:

recognizing the relocation of the instrument by the IMU and/or the imaging sensor unit, calculating a coarse pose of the instrument based on the tracking of the IMU and/or the VPS pose data, selecting a plurality of reference markers to be targeted based on the coarse pose and the design data by the computing unit, executing the targeting data measurement of the plurality reference markers by the targeting unit, and determining a fine pose of the instrument based on the targeting data measurement of the plurality reference markers.

2. The survey instrument according to claim 1, the survey instrument further comprising:

a reference marker recognition functionality for an identification of reference markers with known absolute positions in the environment, and the automatic stationing functionality further comprising:

providing an estimate on a variance of the coarse pose, providing a search radius for the reference marker recognition functionality based on the estimate on the variance of the coarse pose.

3. The survey instrument according to claim 1, the survey instrument further comprising:

a base unit, a support unit mounted on the base unit and configured for being rotatable relative to the base unit by a motorized rotation axis, and a first angle sensor configured for measuring a rotation angle of the support unit, the targeting unit being mounted on the support unit and being tiltable around a motorized tilting axis, wherein the instrument comprising a second angle sensor configured for measuring the tilting angle of the targeting unit relative to the support unit, and the targeting unit comprising a beam exit of a distance measuring beam of a distance meter, in particular of a laser distance meter, defining a measuring axis, and configured for measuring a distance of the targeted feature.

4. The survey instrument according to claim 3, the survey instrument further comprising:

a search radiation emitter configured to emit a search radiation, a reflected radiation receiver configured to detect reflected search radiation, and a search evaluation unit configured to identify a new reference marker by analyzing the reflected search radiation, and to provide a coarse targeting angle information of the new reference marker, wherein the targeting angle information providing the rotation and tilting angles of the targeting unit relative to the base unit to target the new reference marker, the survey instrument being further configured to carry out a reference search functionality, the reference search functionality comprising:

emitting the search radiation by the search radiation emitter, pivoting the search radiation by rotating the survey instrument and/or by tilting the targeting unit, identifying the new reference marker and providing the coarse targeting angle information of the new reference marker by the search evaluation unit, and to provide the absolute coordinates of the new reference marker by measuring them with the targeting unit, to update the design data with the measured absolute position of the identified new reference marker.

5. The survey instrument according to claim 4, wherein the communication interface being further configured to provide the updated design data to further survey instruments, further computing units or to a cloud server.

6. The survey instrument according to claim 1, comprising a further positioning system configured to provide a tracking of further coarse pose data, the further positioning system comprising at least one of, GNSS receiver, WLAN positioning unit, a cellular positioning unit, Bluetooth positioning unit, and the automatic stationing functionality further comprising updating the coarse pose of the instrument based on the tracking of the further coarse pose data.

7. The survey instrument according to claim 1, wherein the imaging sensor unit being further configured to provide identification of the reference markers and further configured to utilize the identified the reference markers for providing the tracking of VPS pose data.

8. The survey instrument according to claim 1, wherein the survey instrument being configured to at least one of:

automatic recognition of a survey task and the environment by analyzing the design data, reception an operator input on the survey task and the environment.

9. The survey instrument according to claim 1, wherein the computing unit being further configured to receive an operator input on a requested second location, calculate a calculated visibility of a set of reference markers in the proximity of the requested second location, calculate a proposed second location for the instrument based on the calculated visibility of the set of reference markers in the proximity of the requested second location, provide guidance instructions for the operator to reach the proposed second location.

10. The survey instrument according to claim 1, wherein the survey instrument being configured to be mounted on a transport vehicle.

* * * * *